(12) United States Patent
Hung

(10) Patent No.: US 7,380,314 B2
(45) Date of Patent: Jun. 3, 2008

(54) HINGE AND MOBILE PHONE WITH THE HINGE

(75) Inventor: Kuo-Wei Hung, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 357 days.

(21) Appl. No.: 11/200,428

(22) Filed: Aug. 9, 2005

(65) Prior Publication Data

US 2007/0033771 A1 Feb. 15, 2007

(51) Int. Cl.
*E05D 3/10* (2006.01)

(52) U.S. Cl. .............................. 16/367; 16/229; 16/330

(58) Field of Classification Search .................. 16/367, 16/330, 338, 303, 328, 331, 229, 236; 455/575.3
See application file for complete search history.

(56) References Cited

U.S. PATENT DOCUMENTS

| 5,937,062 | A  | * | 8/1999  | Sun et al. ............... 379/433.13 |
| 6,839,576 | B2 | * | 1/2005  | Aagaard et al. ......... 455/575.1 |
| 6,976,861 | B2 | * | 12/2005 | McWilliam et al. ........ 439/165 |
| 2004/0192422 | A1 |   | 9/2004  | Watanabe |
| 2005/0245294 | A1 | * | 11/2005 | Gupte et al. ............. 455/575.1 |
| 2005/0245296 | A1 | * | 11/2005 | Hong et al. .............. 455/575.3 |
| 2006/0037175 | A1 | * | 2/2006  | Hyun .......................... 16/221 |
| 2006/0112519 | A1 | * | 6/2006  | Harmon et al. ............... 16/367 |

* cited by examiner

*Primary Examiner*—Patricia Engle
*Assistant Examiner*—Jeffrey O'Brien

(57) ABSTRACT

A mobile phone has a cover, a body and a hinge. The cover has a first bearing with a first cavity. The body has a second bearing with a second cavity and a locking plate at two opposite corners thereof. The hinge includes a transverse shaft being inserted in the first cavity, a vertical shaft extending perpendicularly from one end of the transverse shaft and being inserted in the second cavity, and a locking mechanism being inserted in the first cavity and fixed on the other end of the transverse shaft. The locking mechanism can lock with the locking plate to make the cover be stacked on the body stably. Furthermore, the cover can be firstly rotated vertically 180 degrees about the transverse shaft and then rotated horizontally 180 degrees about the axis of the vertical shaft to make the cover and the body be arranged side by side.

10 Claims, 12 Drawing Sheets

HINGE AND MOBILE PHONE WITH THE HINGE

BACKGROUND OF THE INVENTION

1. Field of the Invention

The present invention generally relates to a hinge, and more particularly, to a hinge adapted to be used in a mobile phone and a mobile phone using the hinge.

2. The Related Art

At present, media mobile phones are popularized. A user can watch a video, play a game and surf Internet by the media mobile phone. In order to carry conveniently for the user, the size of the media mobile phone is often small. Therefore the size of the display panel of the media mobile phone is also small. This is inconvenient for the user to use.

In order to increase the size of the display panel and carry conveniently, a prior media mobile phone disclosed in Pub. No. US2004/0192422 by Watanable et al., published on Sep. 30, 2004, includes a cover and a base. A hinge connects the cover with the base pivotally for opening or closing the media mobile phone. Hence, when the media mobile phone is not in use, the cover is overlapped on the base for being carried conveniently. A display panel is arranged on the cover for increasing its size.

The hinge has a mount. A first transverse shaft and a second transverse shaft extend from opposite sides of the mount, and the two transverse shafts are coupled with the cover pivotally. A vertical shaft extends from the mount perpendicular to the transverse shafts and is supported in the middle of one end of the base rotatably around the center axial thereof.

According to the foregoing description, the transverse shafts only connect with the cover when the cover is stacked on the base, and the cover may shake relatively to the base. As a result, the cover and the base can not be stacked together stably. Furthermore, the transverse shafts and the vertical shaft have a T-shape, the vertical shaft thus can only be fixed in the middle of one end of the base and, as a result, the cover can only be stacked on the base, but can not be opened side by side with the base.

SUMMARY OF THE INVENTION

According to an aspect of the present invention, a hinge which is adapted for rotationally coupling a cover and a body of a mobile phone is provided. The hinge includes a transverse shaft adapted to be assembled with the cover, a vertical shaft extending perpendicularly from one end of the transverse shaft and being adapted to be assembled with the body, and a locking mechanism being fixed on the other end of the transverse shaft. The locking mechanism includes a housing, a locking bolt and a biasing member. The housing has a side wall, a top wall and a bottom wall which encloses a holding space. The side wall defines a cam slot, and the top wall defines a shaft hole. The locking bolt has a locking shaft and a sliding shaft extending perpendicularly from the locking shaft. The locking shaft is disposed in the holding space with an end thereof extending into the shaft hole, and the sliding shaft passes through the cam slot and sticks out of the side wall. The biasing member is disposed between the bottom wall of the housing and the locking shaft for resiliently biasing the locking shaft. When the sliding shaft slides along the cam slot, the locking shaft is driven to stick out of or retract into the shaft hole for releasably locking the transverse shaft to the body.

According to another aspect of the present invention, a mobile phone with a hinge is provided. The mobile phone comprises a cover, a body and a hinge rotationally coupling the cover and the body. The cover has a first display panel and a first bearing. The first bearing defines a first cavity therein extending parallel with the first display panel. A positioning slot is defined in an inner wall of the first cavity. The body has a second bearing and a locking plate at two opposite corners thereof respectively. The second bearing defines a second cavity therein extending perpendicular to the body, and the locking plate defines a locking hole. The hinge includes a transverse shaft being inserted in the first cavity of the first bearing, a vertical shaft extending perpendicularly from one end of the transverse shaft and being inserted in the second cavity of the second bearing, and a locking mechanism being inserted in the first cavity of the first bearing and fixed on the other end of the transverse shaft. The locking mechanism includes a housing, a locking bolt and a biasing member. The housing has a side wall, a top wall and a bottom wall which encloses a holding space. The side wall defines a cam slot, and the top wall defines a shaft hole. The locking bolt has a locking shaft and a sliding shaft extending perpendicularly from the locking shaft. The locking shaft is disposed in the holding space with an end thereof extending into the shaft hole, and the sliding shaft passes through the cam slot and sticks out of the side wall to be positioned in the positioning slot of the first cavity so that the sliding shaft rotates with the cover. The biasing member is disposed between the bottom wall of the housing and the locking shaft for resiliently biasing the locking shaft. When the cover is rotated, the sliding shaft slides along the cam slot, and the locking shaft is driven to stick out of the shaft hole so as to be inserted in the locking hole of the body or retract into the shaft hole so as to be released from the locking hole.

As can be seen from the above description, the hinge has a locking mechanism which can lock the locking plate at one corner of the body, and the vertical shaft of the hinge is mounted on another corner the body. Therefore, both ends of the hinge are coupled with the body of the mobile phone and, as a result, the cover and the body can be stacked together stably.

The hinge includes a transverse shaft and a vertical shaft. The transverse shaft enables the cover to be rotatable about the transverse shaft. The vertical shaft enables the cover to be rotatable about the axis of the vertical shaft. Due to the vertical shaft being assembled with the body at a corner thereof and the locking mechanism capable of being released from the body, the cover can be opened side by side with the body.

Other objects, advantages and novel features of the invention will become more apparent from the following detailed description of a preferred embodiment thereof when taken in conjunction with the accompanying drawings, wherein:

DETAILED DESCRIPTION OF THE PREFERRED EMBODIMENT

Figure 1:
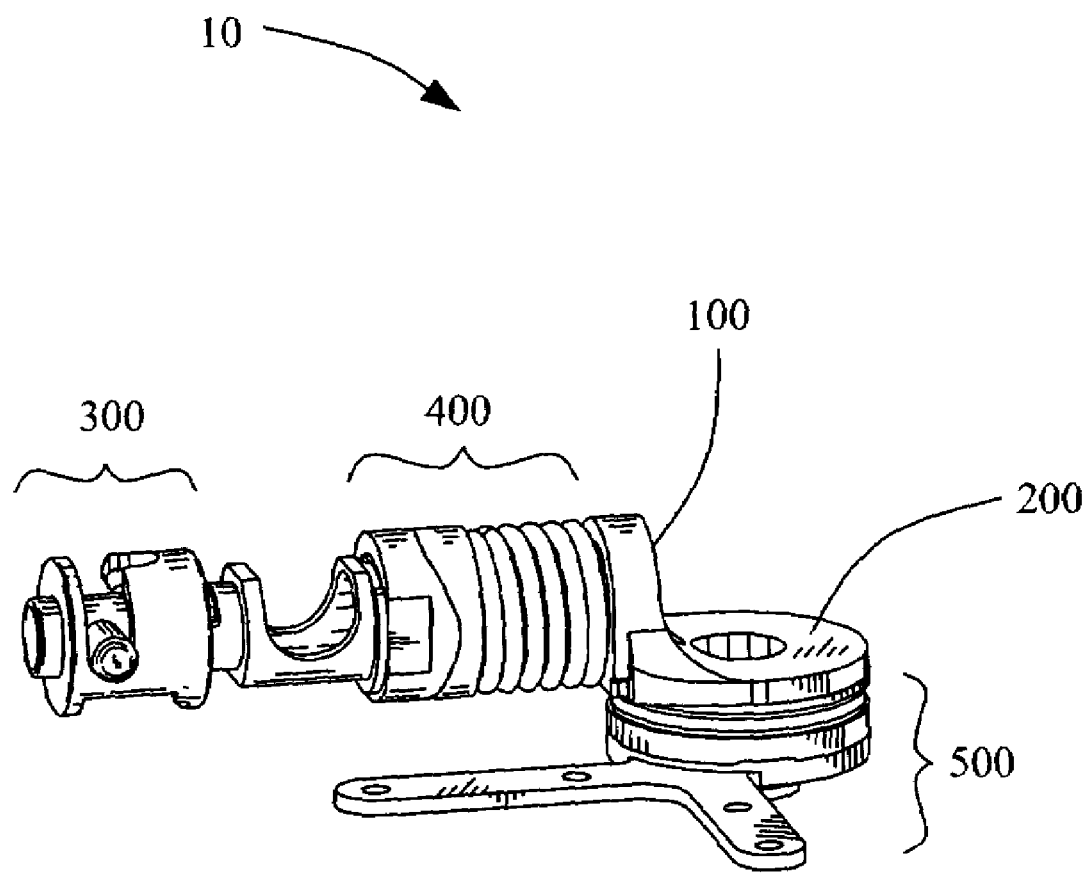
FIG. 1 is an assembled perspective view of a hinge according to the present invention.

With reference to FIG. 1, a hinge 10 having an L-shape is shown, which includes a transverse shaft 100, a vertical shaft 200 extending from one end of the transverse shaft 100 and a locking mechanism 300 fixed on the other end of the transverse shaft 100. Furthermore, the hinge 10 also includes a first cam mechanism 400 disposed on the transverse shaft 100 and a second cam mechanism 500 disposed on the vertical shaft 200.

Figure 2:
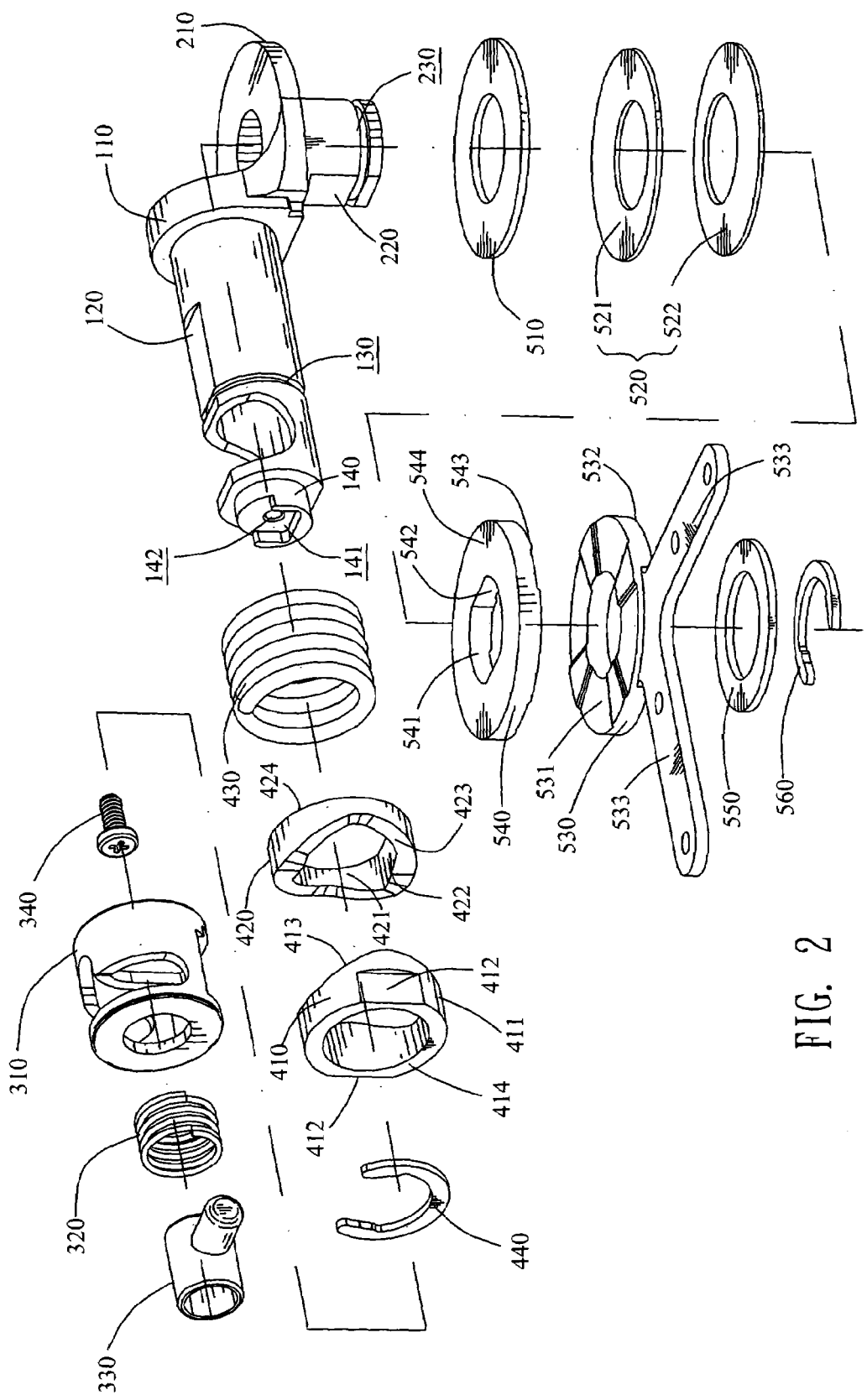
FIG. 2 is an exploded perspective view of the hinge shown in FIG. 1.
Figure 3:
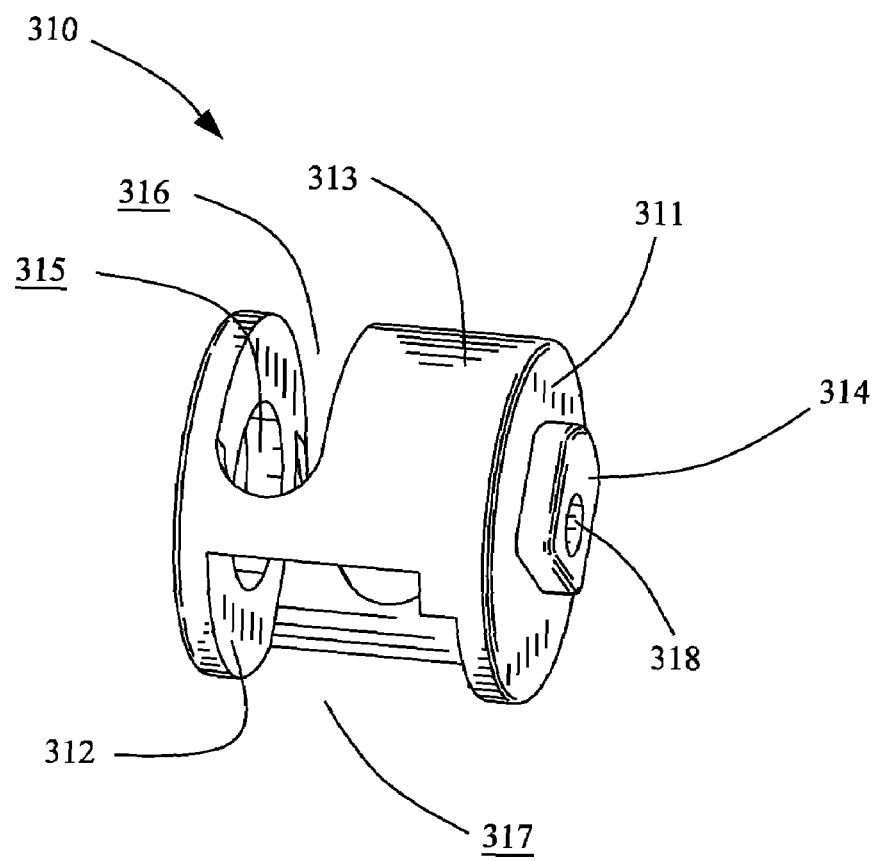
FIG. 3 is a perspective view of a housing of a locking mechanism of the hinge shown in FIG. 1.

With reference to FIG. 2 and FIG. 3, the locking mechanism 300 includes a housing 310, a biasing member 320 and a locking bolt 330. The housing 310 has a bottom wall 311, a top wall 312 and a side wall 313 connecting with the bottom wall 311 and the top wall 312. The walls 311, 312, 313 enclose a holding space for holding the biasing member 320 and the locking bolt 330.

The bottom wall 311 provides a protrusive block 314 on the outside thereof for clipping the locking mechanism 300 on the transverse shaft 100. Furthermore, the bottom wall 311 defines a second threaded hole 318 which extends through the protrusive block 314. The locking mechanism 300 also provides a screw 340 which is inserted into the second threaded hole 318 and fixes the locking mechanism 300 on the transverse shaft 100. The top wall 312 defines a shaft hole 315 at the middle thereof. The side wall 313 defines a cam slot 316 having a narrow width and an access 317 having a large width.

Figure 4:
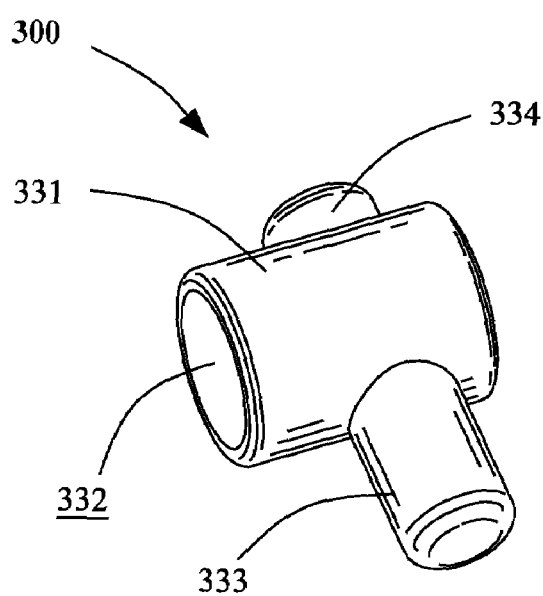
FIG. 4 is a perspective view of a locking bolt of the locking mechanism of the hinge shown in FIG. 1.
Figure 12:
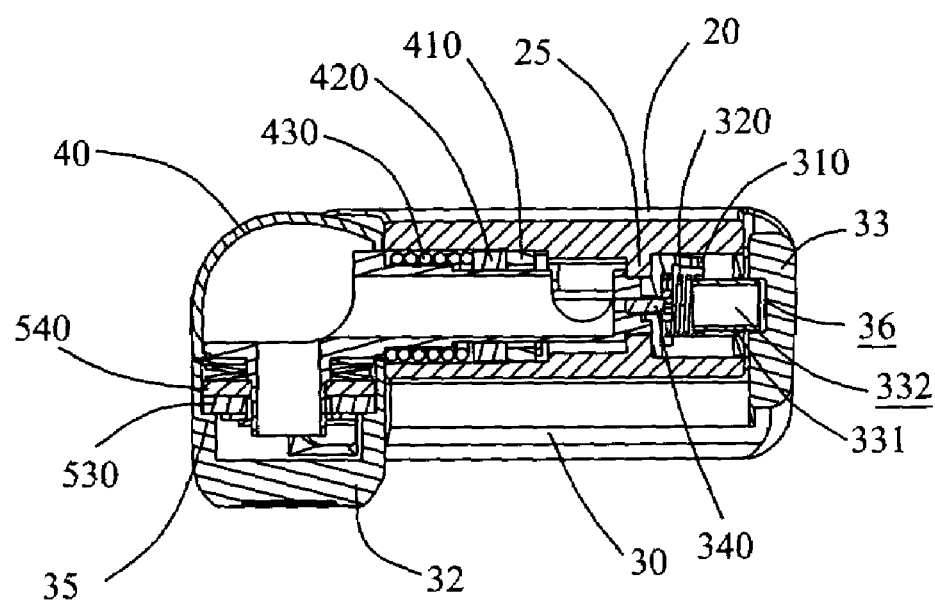
FIG. 12 is a cross-sectional view of the mobile phone taken along line XII-XII of FIG. 8.
Figure 13:
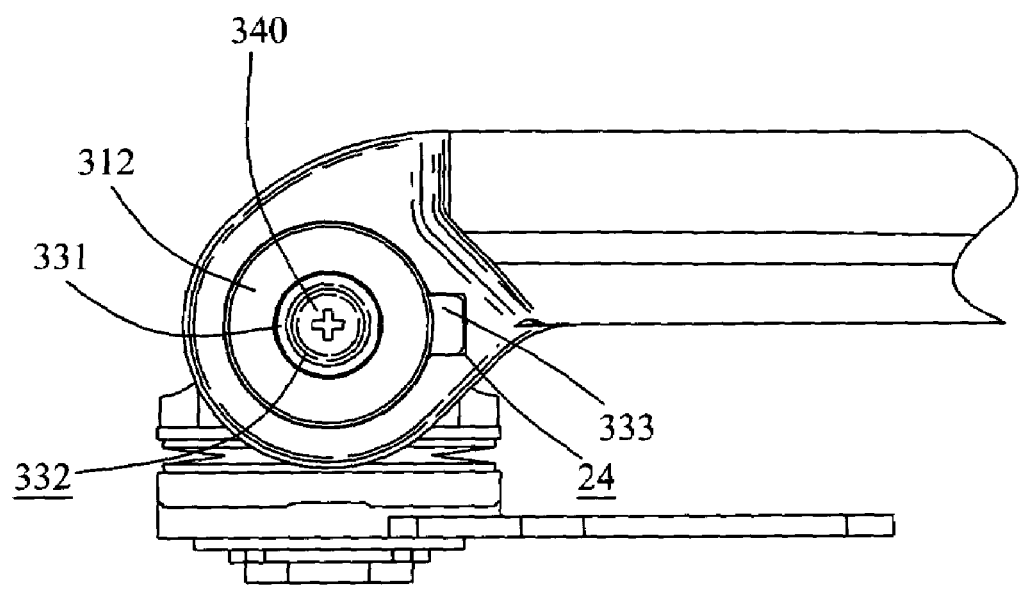
FIG. 13 is a side view of the cover with the hinge being assembled therewith.

With reference to FIG. 4, the locking bolt 330 has a locking shaft 331. The locking shaft 331 is hollow to form a through hole 332 through which the screw 340 can pass for fixing the locking mechanism 300 on the transverse shaft 100, as shown in FIG. 12. A sliding shaft 333 and a blocking shaft 334 extend perpendicularly from the middle of the locking shaft 331.

Figure 5:
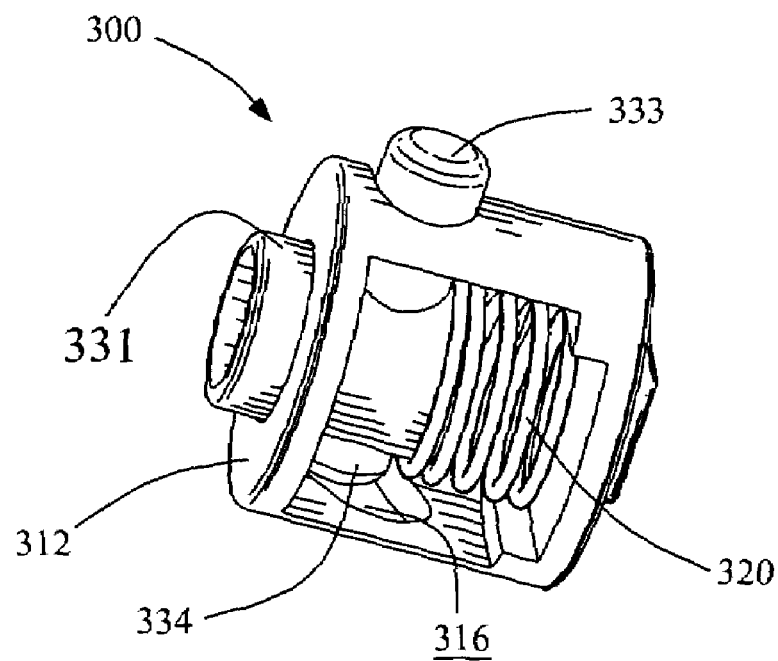
FIG. 5 is an assembled perspective view of the locking mechanism of the hinge shown in FIG. 1.

With reference to FIG. 5, the locking bolt 330 is installed in the holding space of the housing 310 through the access 317. The sliding shaft 333 passes through the cam slot 316 and sticks out the outside of the side wall 313, and the blocking shaft 334 is held in the holding space of the housing 310 completely.

Figure 6:
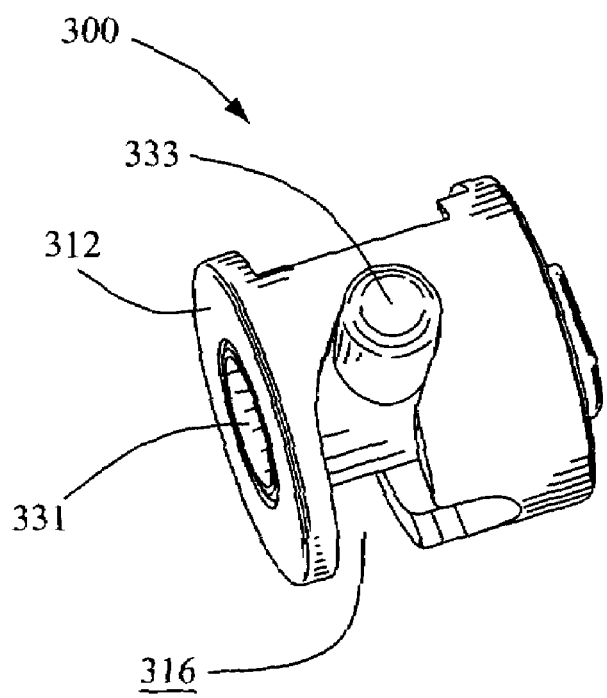
FIG. 6 is another assembled perspective view of the locking mechanism showing a sliding shaft of the locking mechanism slides from one end of a cam slot to the other end.

With reference to FIGS. 2, 5 and 6, the biasing member 320 is a spiral spring, which is installed in the holding space of the housing 310 through the access 317. One end of the biasing member 320 is disposed on the locking shaft 331 and leans against the sliding shaft 333 and the blocking shaft 334, and the other end leans against the bottom wall 311 of the housing 310. As can be seen from FIGS. 5 and 6, the top wall 312 is more distant from one end of the cam slot 316 than the other end. When the sliding shaft 333 slides along the cam slot 316, the locking bolt 330 moves along the extending direction of the transverse shaft 100 to urge one end of the locking shaft 331 to stick out of or retract into the shaft hole 315 of the top wall 312. FIG. 5 shows that the sliding shaft 333 is positioned in the end of the cam slot 316 which is closer to the top wall 312 to drive the connected locking shaft 331 out of the top wall 312. FIG. 6 shows that the locking shaft 331 retracts into the shaft hole 315 because the sliding shaft 333 is positioned in the other end of the cam slot 316 which is farther away from the top wall 312.

Referring to FIG. 2 together with FIG. 1, the transverse shaft 100 forms a first pedestal 110 at one end thereof joining to the vertical shaft 200 with a diameter larger than the diameter of the transverse shaft 100. Outer wall of the transverse shaft 100 is partially cut to form a pair of first keyed surfaces 120 at an upper side and an opposite lower side thereof in parallel with the axis of the transverse shaft 100. A first groove 130 is defined in and around the transverse shaft 100 at an end opposite to the first pedestal 110. A mounting bracket 140 extends from the other end of transverse shaft 100 where the first groove 130 is defined at, and a clipping trough 141 and a first threaded hole 142 are defined in the mounting bracket 140. The protrusive block 314 of the locking mechanism 300 is inserted in the clipping trough 141 and is clipped therein for preventing the locking mechanism 300 from rotating relatively to the transverse shaft 100. The screw 340 of the locking mechanism 300 is screwed in the first and second threaded holes 318, 142 for fixing the locking mechanism 300 on the transverse shaft 100.

The vertical shaft 200 forms a second pedestal 210 at one end thereof joining to the transverse shaft 100 with a diameter larger than the diameter of the vertical shaft 200. Outer wall of the vertical shaft 200 is partially cut to form a pair of second keyed surfaces 220 at a left side and an opposite right side thereof in parallel with the axis of the vertical shaft 200. A second groove 230 is defined in and around the vertical shaft 200 at an end opposite to the second pedestal 210.

The first cam assembly 400 comprises a first cannular cam 410, a first cannular cam follower 420, a first resilient means 430, and a first positioning spacer 440. The first positioning spacer 440 is C-shaped. The first cannular cam 410 has an outer wall 411. The outer wall 411 is partially cut to form a pair of third keyed surfaces 412 parallel with the axis of the first cannular cam 410. At one side of the first cannular cam 410 is a first cam profile 413, while a first flat surface 414 is at the other side opposite to the first cam profile 413. The first cannular cam follower 420 has an inner wall 421 with a pair of fourth keyed surfaces 422 formed thereon for mating with the first keyed surfaces 120 of the transverse shaft 100. At one side of the first cannular cam follower 420 is a first complementary cam profile 423, while at its opposite side is a second flat surface 424. Preferably, the first resilient means 430 is a spiral spring. During assembly the first resilient means 430 is disposed on the transverse shaft 100 first, followed by the first cannular cam follower 420 and the first cannular cam 410. Finally, the first positioning spacer 440 is wedged in the first groove 130 of the transverse shaft 100 and propped against the first flat surface 414 of the first cannular cam 410, thereby positioning the first cannular cam 410, the first cannular cam follower 420 and the first resilient means 430 between the first pedestal 110 and the first positioning spacer 440. After assembly, the first cam profile 413 rests against the first complementary cam profile 423. The first resilient means 430 makes contact throughout the first pedestal 110 and the second flat surface 424 of the first cannular cam follower 420 to distribute axial forces thereon to resiliently bias the first cannular cam follower 420 and the first cannular cam 410 into engagement.

After assembly, the first cannular cam 410 is keyed to a cover of a mobile phone by the third keyed surfaces 412 (detailed in the following). As a result, the first cannular cam 410 rotates with the cover and rotationally urges the first complementary cam profile 423 of the first cannular cam follower 420. The fourth keyed surfaces 422 of the first cannular cam follower 410 key to the first keyed surfaces 120 of the transverse shaft 100, which restricts the first cannular cam follower 420 from rotation, while allows the first cannular cam follower 420 to axially slide on the transverse shaft 100 in response to compressive forces of the first resilient means 430 or urging forces of the first cannular cam 410.

The second cam assembly 500 comprises a ring spacer 510, a second resilient means 520, a second cannular cam 530, a second cannular cam follower 540, a bearing gasket 550, and a second positioning spacer 560. The second positioning spacer 560 is C-shaped. At one side of the second cannular cam 530 is a second cam profile 531, while a third flat surface 532 is at the other side opposite to the second cam profile 531. The second cannular cam 530 forms a pair of mounting legs 533 for being fixed to a body of the mobile phone as will be described in greater detail hereinafter. The second cannular cam follower 540 has an inner wall 541 with a pair of fifth keyed surfaces 542 formed thereon for mating with the second keyed surfaces 220 of the vertical shaft 200. At one side of the second cannular cam follower 540 is a second complementary cam profile 543, while at its opposite side is a fourth flat surface 544. Preferably, the second resilient means 520 includes a pair of resilient spacers 521, 522, one of which is dome-shaped, and the other of which is inverted dome-shaped. The resilient spacers 521, 522 with such shapes are deformable to provide compressive forces. During assembly the ring spacer 510, the second resilient means 520, the second cannular cam follower 540, the second cannular cam 530, and the bearing gasket 550 are disposed on the vertical shaft 200 in order. Finally, the second positioning spacer 560 is wedged in the second groove 230 of the vertical shaft 200 and propped against the third flat surface 532 of the second cannular cam 530 together with the bearing gasket 550, thereby positioning the second cannular cam 530, the second cannular cam follower 540, the second resilient means 520 and the ring spacer 510 between the second pedestal 210 and the second positioning spacer 560. After assembly, the second cam profile 531 rests against the second complementary cam profile 543. The ring spacer 510 makes contact throughout the second pedestal 210 and the second resilient means 520 makes contact throughout the ring spacer 510 and the fourth flat surface 544 of the second cannular cam follower 540 to distribute axial forces thereon to resiliently bias the second cannular cam follower 540 and the second cannular cam 530 into engagement.

After assembly, the fifth keyed surfaces 542 of the second cannular cam follower 540 key to the second keyed surfaces 220 of the vertical shaft 200, which allows the second cannular cam follower 540 to rotate with the vertical shaft 200 and to axially slide on the vertical shaft 200 in response to compressive forces of the second resilient means 520.

Figure 7:
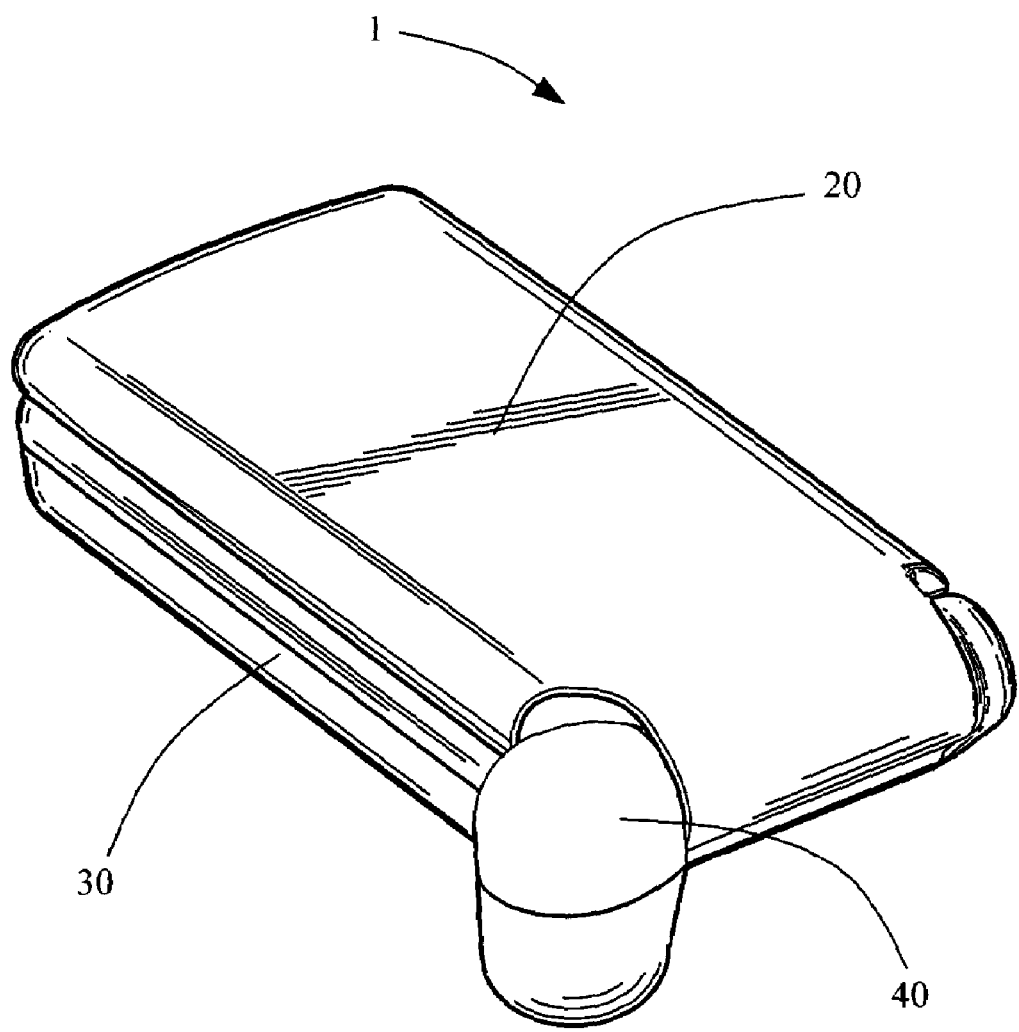
FIG. 7 is an assembled perspective view of the mobile phone with the hinge shown in FIG. 1.

Referring to FIG. 7, a mobile phone 1 using the hinge 10 of the present invention is shown. The mobile phone 1 has a cover 20 and a body 30. The hinge 10 rotationally couples the cover 20 and the body 30.

Figure 8:
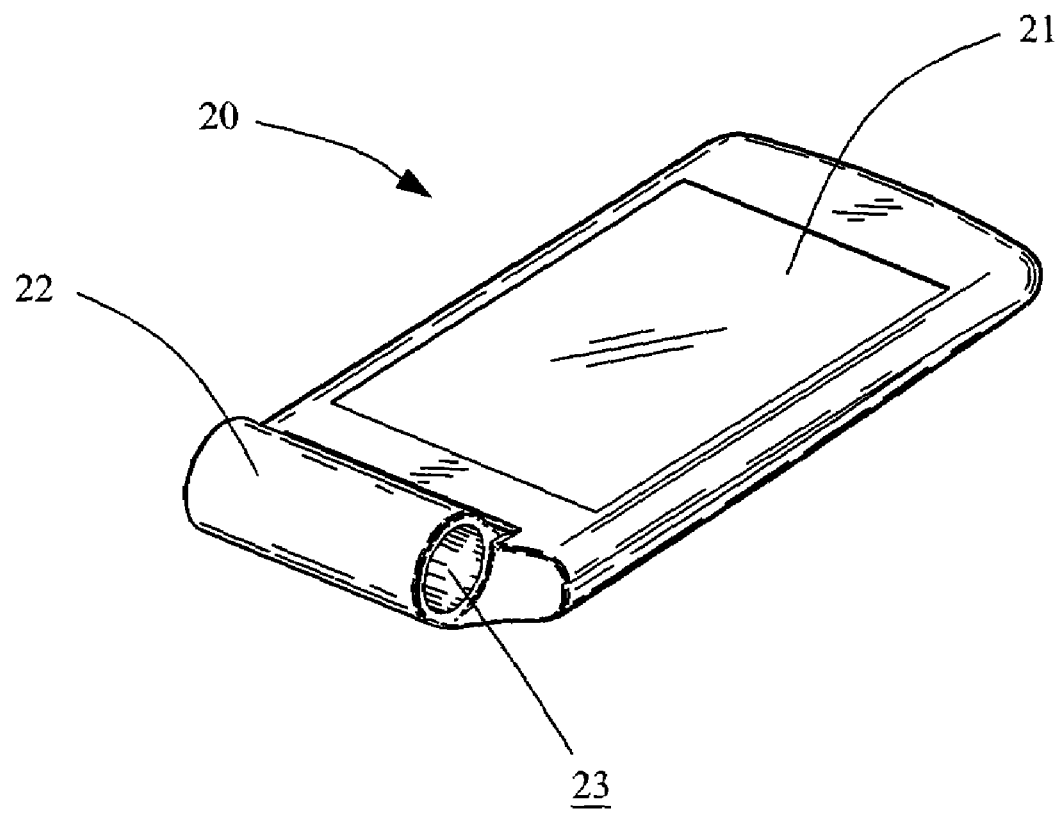
FIG. 8 is a perspective view of a cover of the mobile phone shown in FIG. 7.
Figure 9:
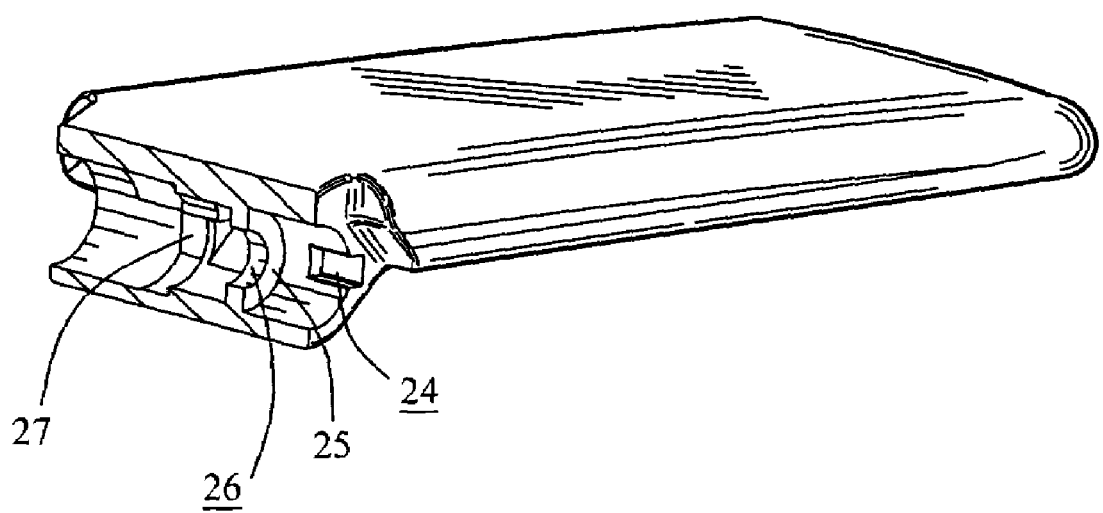
FIG. 9 is a perspective view of the cover shown in FIG. 8 with a first bearing of the cover shown in cross-section.

Referring to FIG. 8 and FIG. 9, the cover 20 has a first display panel 21 thereon. A first bearing 22 is integrally molded at one end of the cover 20. A first cavity 23 is defined in the first bearing 22 extending parallel with the first display panel 21. A positioning slot 24 is defined in an inner wall of the first cavity 23 and parallel with the axis of the first bearing 22. A blocking seat 25 extends from the inner wall of the first cavity 23 adjacent to the positioning slot 24 to divide the first cavity 23 into two parts, and a connecting opening 26 is defined in the middle of the blocking seat 25 with a diameter smaller than the diameter of first cavity 23 to connect the two parts of the first cavity 23. The inner wall of the first cavity 23 is partially cut to form a pair of keyed portions 27 at a front side and an opposite back side thereof in parallel with the axis of the first bearing 22.

Figure 10:
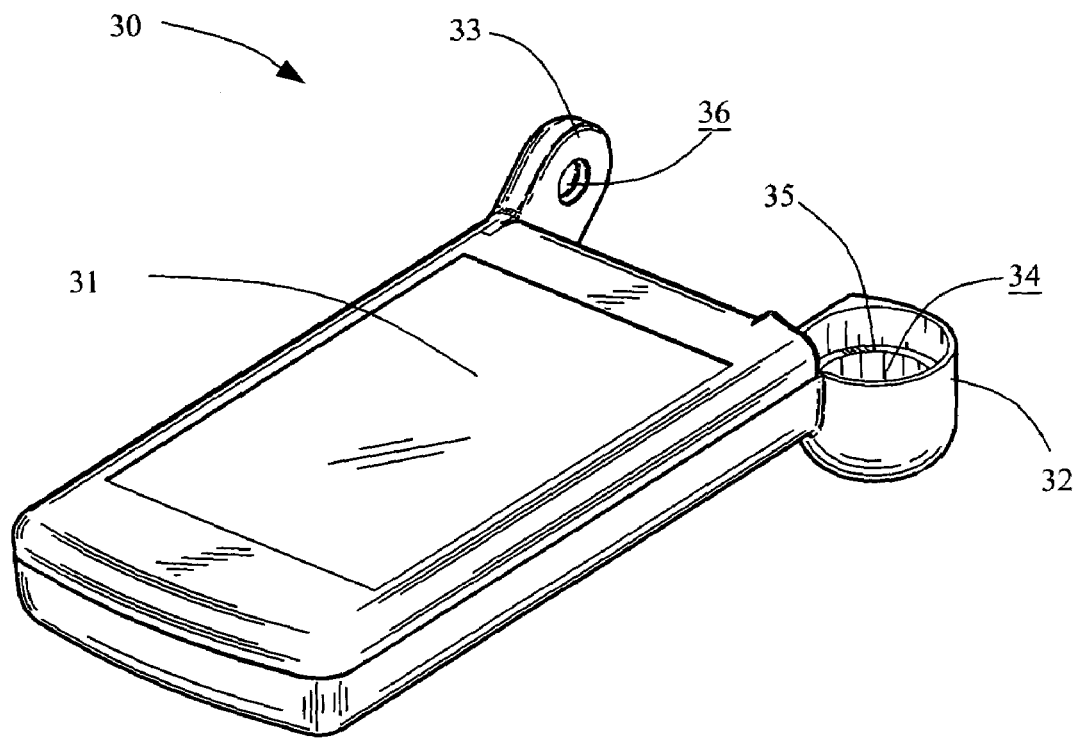
FIG. 10 is a perspective view of a body of the mobile phone shown in FIG. 7.
Figure 11:
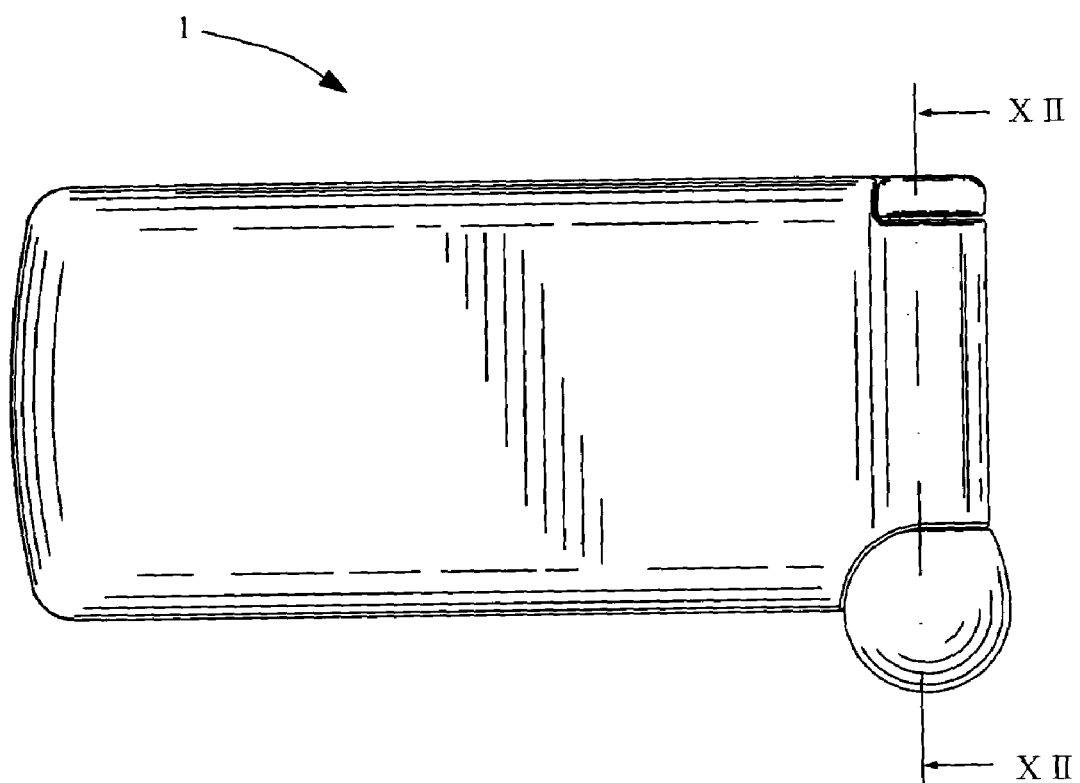
FIG. 11 is a top plan view of the mobile phone shown in FIG. 7.

Referring to FIG. 10, the body 30 has a second display panel 31 thereon. A second bearing 32 is integrally molded at a corner of the body 30. A second cavity 34 is defined in the second bearing 32 extending perpendicular to the second display panel 31, and a ring supporter 35 is formed along the inner wall of the second cavity 34. A locking plate 33 extends obliquely and upward from an opposite corner of the body 30, and a locking hole 36 is defined in the locking plate 33.

Please refer to FIGS. 9 and 11-13. In assembly of the mobile phone 1, the transverse shaft 100 together with the first cam assembly 400 is inserted in the first cavity 23 from one end of the first bearing 22. The third keyed surfaces 412 of the first cannular cam 410 are keyed with the keyed portions 27 for preventing the first cannular cam 410 from rotating relatively to the cover 20. Thus the first cannular cam 410 rotates with the cover 20 around the transverse shaft 100, namely, a transverse axis, while the transverse shaft 100 remains stationary, and the first cannular cam follower 420 slides along the transverse shaft 100. The first cam profile 413 and the first complementary cam profile 423 are chosen to position the cover 20 in one or more positions while vertically rotating the cover 20. The locking mechanism 300 is inserted into the first cavity 23 from the other end of the first bearing 22. The sliding shaft 333 of the locking mechanism 300 is clipped in the positioning slot 24 of the first bearing 22, therefore when the cover 20 is rotated relatively to the body 30, the cover 20 urges the sliding shaft 333 to slide along the cam slot 316 of the locking mechanism 300. The protrusive block 314 of the locking mechanism 300 is inserted into the connecting opening 26 of the first bearing 22 of the cover 20 and clipped in the clipping trough 141 of the transverse shaft 100. The screw 340 of the locking mechanism 300 screws in the first and second threaded holes 142, 318 to fix the locking mechanism 300 and the transverse shaft 100 together stably. Therefore, the locking mechanism 300 and the transverse shaft 100 are disposed at two sides of the blocking seat 25 of the cover 20;

as a result, the blocking seat 25 can prevent the cover 20 from slipping off the hinge 10.

The vertical shaft 200 together with the second cam assembly 500 is inserted in the second cavity 34 of the second bearing 32. The pair of mounting legs 533 of the second cannular cam 530 is mounted on the body 30 to fix the second cannular cam 530 to the body 30, and the second cannular cam 530 is supported on the ring supporter 35. The vertical shaft 200 rotates in the second cavity 32. The rotation of the vertical shaft 200 makes the cover 20 to rotate about the vertical shaft 200, namely, a vertical axis. The second cannular cam follower 540 rotates with and slides along the vertical shaft 200. The second cam profile 531 and the second complementary cam profile 543 are chosen to position the cover 20 in one or more positions while horizontally rotating the cover 20. Referring again to FIG. 7 and FIG. 12, the mobile phone 1 further comprises a cap 40 covered on the exposed portion of the hinge 10, thereby hiding the hinge 10.

When the mobile phone 1 is not in use, the cover 20 is stacked on the body 30. At this time, one end of the locking shaft 331 of the locking bolt 330 is inserted in the locking hole 36 of the locking plate 33 of the body 30. Therefore, the two ends of the hinge 10 are fixed on the body 30 and, as a result, the hinge can prevent the cover 20 from shaking relatively to the body 30.

When the mobile phone 1 is not in use, the cover 20 is stacked on the body 30. At this time, one end of the locking shaft 331 of the locking bolt 330 is inserted in the locking hole 36 of the locking plate 33 of the body 30. Therefore, the two ends of the hinge 10 is fixed on the body 30, as a result, the hinge can prevent the cover 20 from shaking relatively to the body 30.

Figure 14:
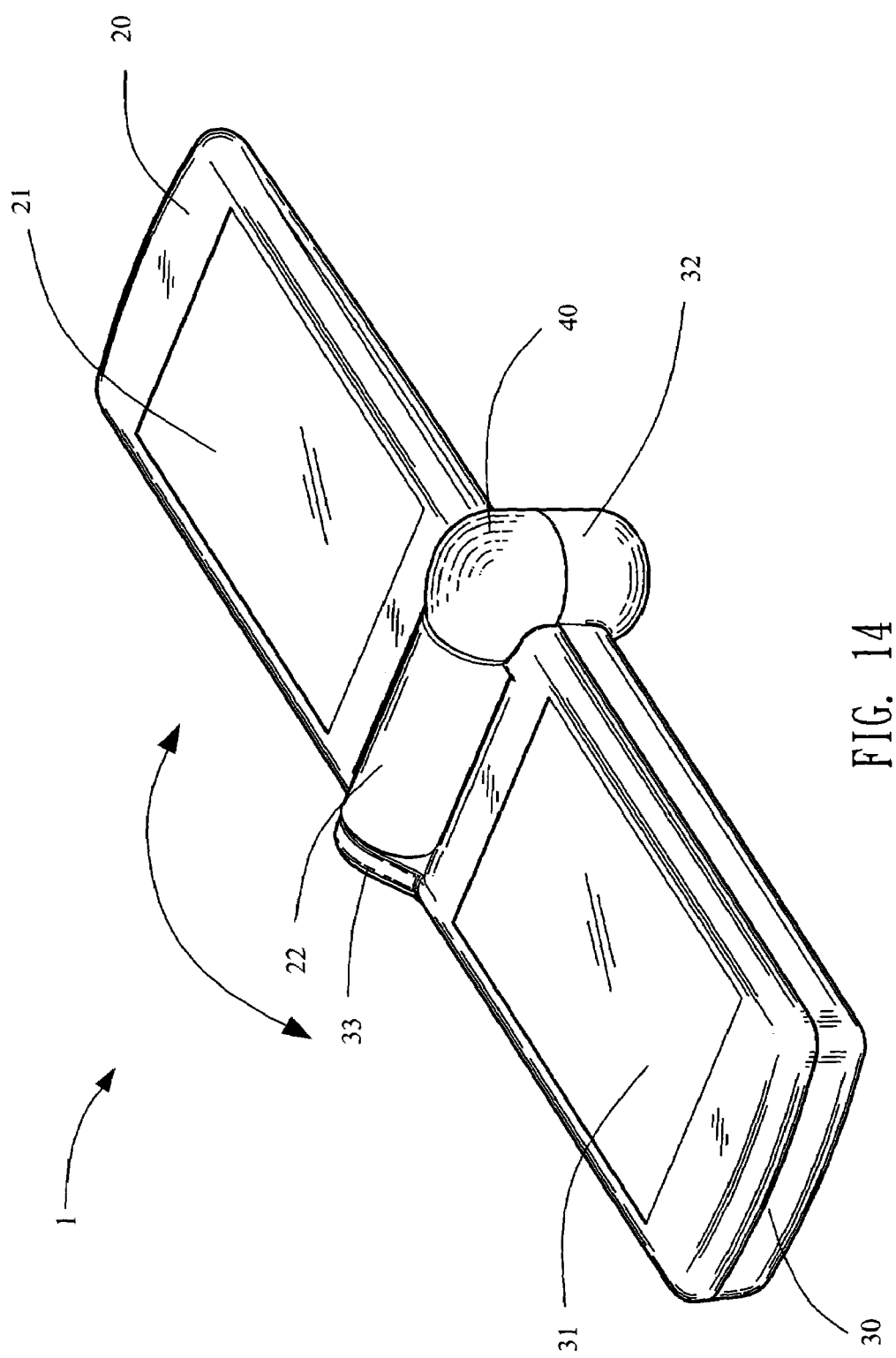
FIG. 14 is a perspective view of the mobile phone showing the cover being rotated vertically 180 degrees about a transverse shaft.
Figure 15:
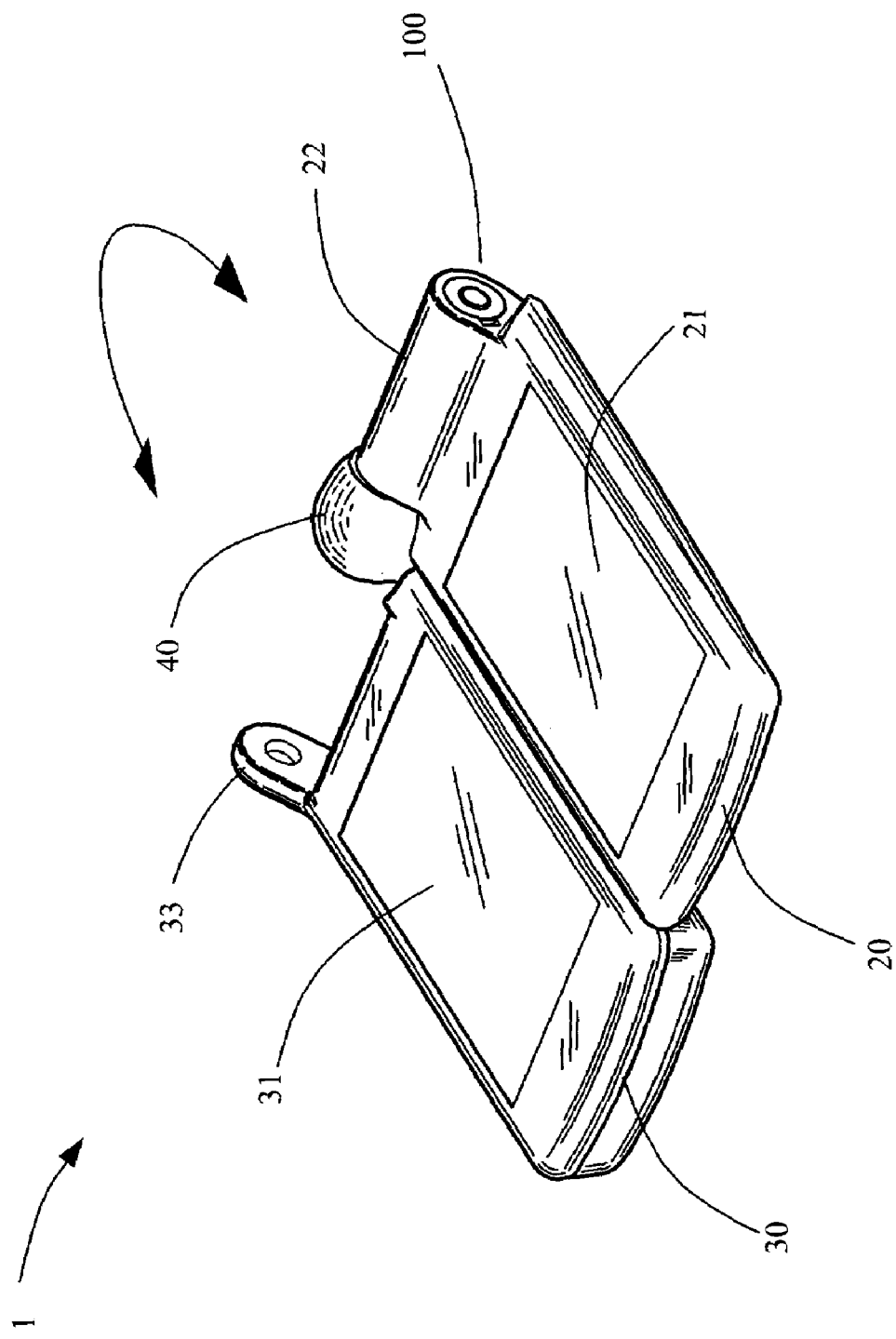
FIG. 15 is a perspective view of the mobile phone showing the cover being further rotated horizontally 180 degrees about an axis of the vertical shaft to a position where the cover is side by side with the body.

When the mobile phone 1 is in use, the cover 20 is firstly rotated about the transverse shaft 100. In the course of the cover being rotated, the cover 20 drives the sliding shaft 333 to slide along the cam slot 316, which urges the locking shaft 331 to move in the extending direction of the transverse shaft 100 to separate from the locking hole 36. When the cover 20 is rotated vertically 180 degrees to a position where the cover 20 is coplanar with the body 30 as shown in FIG. 14, the locking shaft 331 is retracted into the shaft hole 315 and released from the locking hole 36 of the body 30. Then the cover 20 is rotated horizontally 180 degrees about the axis of the vertical shaft 200 to a position where the cover 20 is side by side with the body 30 as shown is FIG. 15. Thus the first display panel 21 and the second display panel 31 are arranged side by side to increase the area of display.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

What is claimed is:

1. A hinge adapted for rotationally coupling a cover and a body of a mobile phone about two perpendicular axes comprising:
   a transverse shaft adapted to be assembled with said cover;
   a vertical shaft extending perpendicularly from one end of the transverse shaft, the vertical shaft being adapted to be assembled with said body; and
   a locking mechanism being fixed on the other end of the transverse shaft, said locking mechanism including:
   a housing having a side wall, a top wall and a bottom wall which enclose a holding space, the side wall defining a cam slot having two ends with one end more distant from the top wall than the other end, the top wall defining a shaft hole;
   a locking bolt having a locking shaft and a sliding shaft being connected to and protruding perpendicularly from the locking shaft, the locking shaft being disposed in the holding space with an end thereof extending into the shaft hole, the sliding shaft passing through the cam slot and sticking out of the side wall; and
   a biasing member disposed between the bottom wall of the housing and the locking shaft for resiliently biasing the locking shaft;
   whereby when the sliding shaft slides along the cam slot, the locking shaft is driven to stick out of the top wall through the shaft hole so as to be received in a locking hole of said body for locking the transverse shaft to said body or retract from said locking hole into the shaft hole for releasing the transverse shaft from said body.

2. The hinge as claimed in claim 1, wherein the side wall of the housing further defines an access through which the biasing member and the locking bolt are installed into the holding space of the housing.

3. The hinge as claimed in claim 1, wherein the locking bolt further has a blocking shaft extending perpendicularly from the locking shaft against which the biasing member is propped.

4. The hinge as claimed in claim 1, wherein the bottom wall of the housing provides a protrusive block on an outer side thereof, one end of the transverse shaft that fixes to the locking mechanism provides a mounting bracket for supporting the protrusive block.

5. The hinge as claimed in claim 4, wherein one end of the transverse shaft that fixes to the locking mechanism defines a first threaded hole, the bottom wall of the housing defines a second threaded hole, and the locking mechanism further includes a screw screwed in the first and second threaded holes.

6. A mobile phone comprising:
   a cover having a first display panel and a first bearing, the first bearing defining a first cavity therein extending parallel with the first display panel, a positioning slot being defined in an inner wall of the first cavity;
   a body having a second bearing and a locking plate at two opposite corners thereof respectively, the second bearing defining a second cavity therein extending perpendicular to the body, the locking plate defining a locking hole; and
   a hinge rotationally coupling the cover and the body, the hinge comprising:
   a transverse shaft being inserted in the first cavity of the first bearing;
   a vertical shaft extending perpendicularly from one end of the transverse shaft and being inserted in the second cavity of the second bearing; and
   a locking mechanism being inserted in the first cavity of the first bearing and fixed on the other end of the transverse shaft, said locking mechanism including:
   a housing having a side wall, a top wall and a bottom wall which enclose a holding space, the side wall defining a cam slot having two ends with one end more distant from the top wall than the other end, the top wall defining a shaft hole;

a locking bolt having a locking shaft and a sliding shaft being connected to and protruding perpendicularly from the locking shaft, the locking shaft being disposed in the holding space with an end thereof extending into the shaft hole, the sliding shaft passing through the cam slot and sticking out of the side wall to be positioned in the positioning slot of the first cavity, thereby the sliding shaft rotating with the cover; and a biasing member disposed between the bottom wall of the housing and the locking shaft for resiliently biasing the locking shaft;

whereby when the cover is rotated, the sliding shaft slides along the cam slot, and the locking shaft is driven to stick out the top wall through the shaft hole so as to be received in the locking hole for locking the transverse shaft to said body or retract from the locking hole into the shaft hole for releasing the transverse shaft from said body.

7. The mobile phone as claimed in claim 6, wherein the hinge further comprises a first cam mechanism disposed on the transverse shaft and a second cam mechanism disposed on the vertical shaft.

8. The mobile phone as claimed in claim 7, wherein the first bearing of the cover provides a blocking seat on the inner wall of the first cavity and disposed between the transverse shaft and the locking mechanism to prevent the cover from slipping off the hinge.

9. The mobile phone as claimed in claim 7, wherein the second bearing of the body provides a ring supporter in the second cavity thereof to support the second cam mechanism.

10. The mobile phone as claimed in claim 6, wherein the body further has a second display panel thereon.

* * * * *